United States Patent [19]

Nakamura et al.

[11] 3,964,452

[45] June 22, 1976

[54] HIGH COMPRESSION INTERNAL COMBUSTION ENGINE USING A LEAN CHARGE

[75] Inventors: Norihiko Nakamura; Toyokazu Baika, both of Susono, Japan

[73] Assignee: Toyota Jidosha Kogyo Kabushiki Kaisha, Japan

[22] Filed: Sept. 27, 1973

[21] Appl. No.: 401,459

[30] Foreign Application Priority Data

Aug. 4, 1973  Japan................................. 48-87226

[52] U.S. Cl....................... 123/78 AA; 123/78 BA; 123/78 D
[51] Int. Cl.² .......................................... F02B 75/04
[58] Field of Search......... 123/78 AA, 78 B, 78 BA, 123/78 R, 191 R, 73 AC, 198 A, 78 D, 48 R, 48 AA, 48 D

[56] References Cited
UNITED STATES PATENTS

| | | | |
|---|---|---|---|
| 1,191,174 | 7/1916 | Gilligan.............................. | 123/78 B |
| 1,557,987 | 10/1925 | Coryell.............................. | 123/78 B |
| 1,752,379 | 4/1930 | Goodwin............................ | 123/78 A |
| 1,979,746 | 11/1934 | Kenneweg....................... | 123/78 AA |
| 2,154,505 | 4/1939 | Griffith ........................... | 123/78 AA |
| 2,392,371 | 1/1946 | Fisher ......................... | 123/198 A X |
| 2,500,409 | 3/1950 | Hawkins........................... | 123/78 AA |
| 2,686,505 | 8/1954 | McCuen...................... | 123/191 R X |
| 3,014,468 | 12/1961 | Mansfield................... | 123/191 R X |

FOREIGN PATENTS OR APPLICATIONS 507,086    11/1954    Canada................................ 123/78

OTHER PUBLICATIONS

*Diesel and High Compression Gas Engines–Fundamentals,* E. J. Kates, American Technical Society, 1955 pp. 308; 330–339.

*Primary Examiner*—Charles J. Myhre
*Assistant Examiner*—William C. Anderson
*Attorney, Agent, or Firm*—Kenyon & Kenyon

[57] ABSTRACT

A spring-loaded piston is slidably arranged in an auxiliary chamber opening into the combustion chamber of an internal combustion engine. The spring-loading of the piston is preset so that the piston retracts at a certain high pressure attained during the combustion process, thereby increasing the combustion chamber volume. This enables higher compression ratios to be used than is otherwise possible.

6 Claims, 6 Drawing Figures

HIGH COMPRESSION INTERNAL COMBUSTION ENGINE USING A LEAN CHARGE

This invention relates to internal combustion engines, and in particular to an improved combustion chamber thereof.

Noxious components such as HC, CO and NO contained in the exhaust gas discharged from an internal combustion engine, particularly from an automobile engine, cause air pollution problems a solution to which is urgently required. Various methods are known for excluding, or diminishing the amount of these noxious components from the exhaust gas. For example, methods such as an afterburner, thermal reactor, catalizer, and air-injection are in use to exclude or diminish HC or CO components, and in each of these methods a secondary combustion takes place in the exhaust system of the engine. Further, methods such as water-injection, recirculation of the exhaust gas, and control of the timing of the ignition are in use to exclude or diminish the NO component. However, the methods heretofore in use, or the devices according to these methods, reduce the thermal efficiency of the engine and present the drawbacks of decreased engine output and increased fuel consumption.

Generally, to increase the thermal efficiency of an automobile gasoline engine it is effective to raise the compression ratio and/or to use a lean mixture. In respect to the former, we have the following relationship from the theoretical thermal efficiency formula of the Otto Cycle:

$$\eta = 1 - (1/\epsilon)^{K-1}$$

where $\eta$ represents the theoretical thermal efficiency, $\epsilon$ the compression ratio, and $K$ the specific heat ratio.

It is evident that the compression ratio ($\epsilon$) is an important factor for determining the thermal efficiency, and if ($\epsilon$) increases ($\eta$) also increases. However, increase of the compression ratio tends to produce knocking. In addition, since in recent years the octane number of gasoline has tended to fall with efforts to reduce the lead content thereof, increase of the compression ratio has become even more difficult. Further, when the compression ratio of an engine is raised, this raises the pressure and temperature in the combustion chamber, which in turn means that more NO components tend to be produced in the exhaust gas. This also makes it difficult to increase the compression ratio.

The method using a lean mixture is particularly useful for elevating the thermal efficiency since it allows the rate of fuel consumption to be limited as well as diminishing the quantities of HC, Co and NO componets produced in the exhaust gas without any further apparatus. However, the use of a lean mixture (i.e. large air-fuel ratio) presents difficulties in that if the air-fuel ratio is large, misfire may occur due to the presence of residual gas, and also in that the combustion fluctuation becomes larger.

As stated above, though the thermal efficiency may be increased by increasing the compression ration, increase of the compression ratio tends to produce knocking and an increase of the NO component. In this case, the reason knocking occurs, particularly in high load driving, is in that the pressure in the combustion chamber during combustion increases rapidly, causing the unburnt mixture in the combustion chamber to undergo adiabatic compression, which raises its temperature and finally results in spontaneous combustion. In this case, as the flame propagation speed is equal to that of a pressure wave (i.e. the velocity of sound), combustion occurs within a extremely short space of time. This causes, particularly in heavy knocking, the piston, exhaust valve and the like to be damaged. The exceptionally high temperature (absolute temperature), i.e., exceptionally high pressure (absolute pressure), in the combustion chamber also results in production of NO.

It will, therefore, the understood that in order to decrease the occurrence of knocking and the creation of NO the maximum pressure in the combustion chamber should be restricted. The pressure in the combustion chamber may be decreased by decreasing the pressure in the intake manifold if the compression ratio is constant, and the pressure in the combustion chamber increases with increase of the pressure of the intake mixture, i.e. the pressure in the intake manifold.

In other words, even if a higher than usual compression ratio is used the pressure in the combustion chamber can be decreased by decreasing the pressure in the intake manifold (i.e. increasing the negative pressure in the intake manifold), and it is consequently possible to prevent the occurrence of knocking and the creation of NO. In addition to this, use of a higher compression ratio contributes to reducing the rate of fuel consumption.

In order to decrease the creation of NO, it is also desirable to restrict the maximum temperature in the combustion chamber as well as the maximum pressure.

It has been experimentally confirmed by H.K. Newhall and others that the reaction of NO formation occurs behind the flame front, that is, in the combustion gas. Therefore, in order to control this reaction, it is very effective to restrict the temperature of the combustion gas behind the flame front.

It will be easily understood from "Arrhenuis' equation" that the reaction of NO formation will be logarithmically decreased by restricting the temperature of the combustion gas behind the flame front. It has also been confirmed by L. J. MUZIO, E. S. STARKMAN and others that the combustion gas behind the flame front further increases in temperature since it undergoes adiabatic compression after combustion. Consequently the temperature of the region of the gas where combustion starts is highest.

The temperature after adiabatic compression (T) is given by the following equation:

$$T = T_o(P/P_o)K-1/K$$

where $P$ represents the pressure after adiabatic compression, $P_o$ the pressure when adiabatic compression starts, $T_o$ the temperature when adiabatic compression starts, and $K$ the specific heat ratio.

Referring to the above equation, it will be easily understood that the temperature ($T$) may be lowered by lowering the pressure ($P$). Therefore it is also effective to restrict the maximum pressure in the combination chamber for the purpose of decreasing NO formation.

Devices for restricting the maximum pressure in the combustion chamber are known which are adapted for diesel engines and wherein restriction is performed by hydraulic circuits. However, due to the fact that these devices are hydraulic, it is impossible to accumulate energy corresponding to the restricted pressure. Therefore these devices, though they make it possible to some degree to diminish the formation of the NO component, have a serious disadvantage in that the rate of fuel consumption increases.

If a lean mixture is used in order to decrease the HC, CO and NO components in the exhaust gas, as already mentioned, the amount of residual gas in the combustion chamber may be decreased by a high compression ratio. As a result of this, combustion fluctuation will decrease and at the same time misfire will be prevented since the temperature of the mixture at ignition will increase with an increase of compression pressure.

From the above it will be clear that it is most effective to use a lean mixture under high compression ratio in order to prevent noxious components (HC, CO, NO) of the exhaust gas from being created and the rate of fuel consumption from being increased.

One of the objects of the present invention is to provide an internal combustion engine provided with a device for automatically restricting the maximum pressure in the combustion chamber.

Another object of the invention is to provide an internal combustion engine capable of using a relatively lean mixture and of igniting over a wide range of operational conditions.

According to the invention, there is provided an internal combustion engine comprising a piston slidably arranged in a cylinder having a cylinder head, a combustion chamber being defined by said cylinder head and said piston, at least the cylinder head or the piston being provided with a pressure control device which is resiliently biased means arranged to displace when the gas pressure in said combustion chamber reaches a predetermined value, whereby the volume of said combustion chamber is increased and said gas pressure is prevented from exceeding said predetermined value, the excess energy of said gas being stored by said displacement of said resiliently biased means.

The invention and its objects and advantages will become more apparent from the detailed description of the preferred embodiments presented below.

In the detailed description of the preferred embodiments of the invention presented below, reference is made to the accompanying drawing, in which.

Figure 1:
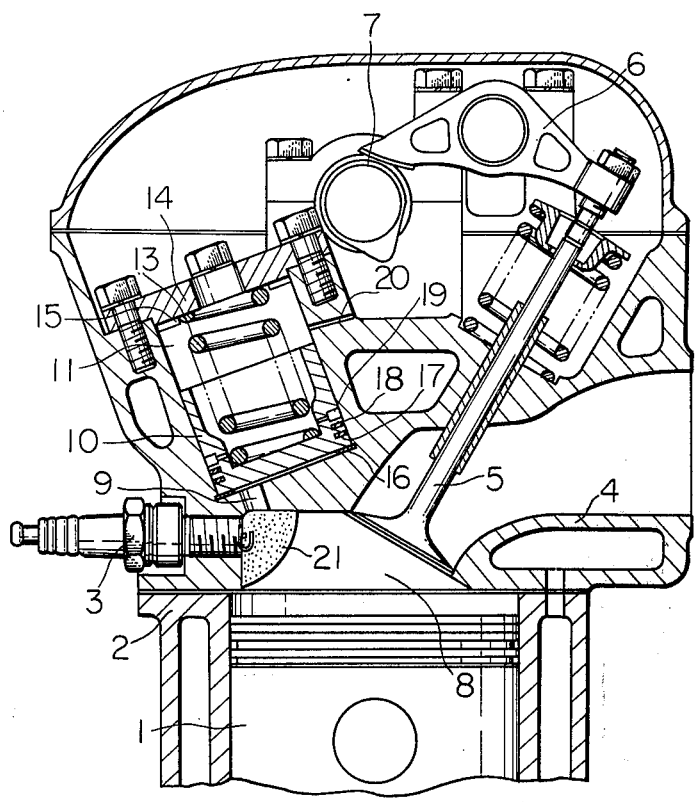
FIG. 1 is a side elevation of an internal combustion engine with a pressure control device according to the present invention.
Figure 2:
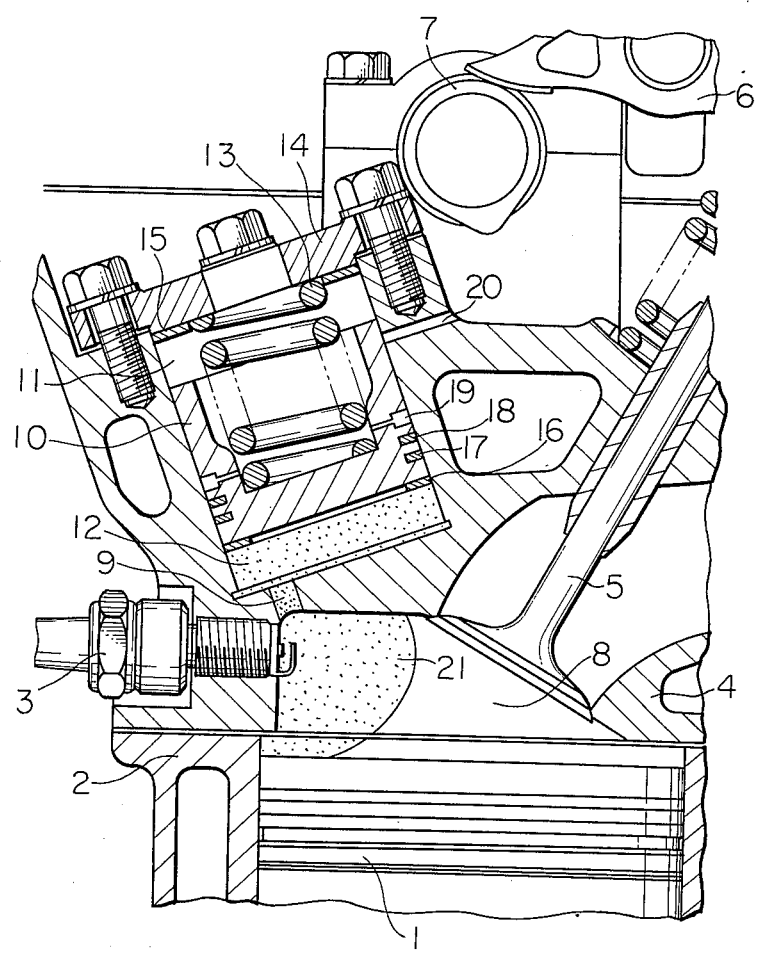
FIG. 2 is a view similar to FIG. 1, but with a pressure control device shown in operation.

Referring now to FIG. 1 and FIG. 2, piston 1 is slidable in a cylinder formed in cylinder block 2 covered, at its upper portion, with cylinder head 4. A mixture is sucked into combustion chamber 8 through intake valve 5 arranged in the intake manifold. 3 is a spark plug for igniting the mixture compressed in combustion chamber 8. Intake valve 5 is controlled by rocking arm 6 operated by rotation of cam 7. These constructions are the same or similar to those of the ordinary internal combustion engine.

According to the present invention, piston 10 is provided over combustion chamber 8 to control the pressure in the chamber 8, and cooperates with another cylinder 11 to form pressure control chamber 12 (FIG. 2). Pressure control chamber 12 communicates with combustion chamber 8 through passage 9. Preferably passage 9 is arranged adjacent to the front end (ignition side) of said plug 3 in order to achieve an object which will be mentioned later. The preset load of spring 13 biases piston 10 towards the side on which passage 9 is positioned, and the other end of spring 13 rests against plate 14 secured to cylinder head 4. Preferably damping members such as hard rubbers 15, 16 are respectively, provided on at least a part of the inner surface of plate 14 and at least a part of the lower face of piston 10, to damp the sound and impact which occurs when piston 10 comes into contact with plate 14 and the lower end face of pressure control chamber 12. Damping member 15 may of course be provided on piston 10 on the surface opposite rubber 16, in place of being provided on the inner surface of plate 14. Piston 10 is further provided with, for example, two piston rings 17, 18, to achieve pressure sealing between the outer peripheral wall of piston 10 and the inner peripheral wall of cylinder 11, and with oil ring 19 for lubricating oil. Lubricating oil which has been supplied in a movable valve system drops gravitationally from oil hole 20.

An internal combustion engine with a pressure control device according to the present invention is operated as follows.

A pressure control device according to the invention is preset so that it will operate only when the pressure in the combustion chamber reaches a predetermined high value. In addition, it should be noted that the compression ratio adopted in the present invention is relatively higher than that of a conventional gasoline engine.

As the pressure in the combustion chamber during the compression stroke, and after ignition under low load operation is low in comparison with the maximum pressure in high load operation of the engine because the bias exerted on piston 10 is smaller than the present load of spring 13, the pressure control device is not operated. Therefore pressure control chamber 12 occupies a position as shown in FIG. 1, i.e., a position in which piston 10 is positioned at the bottom position of the cylinder 11 by spring 13 and the volume of chamber 12 is substantially equal to zero. Accordingly, the combustion cycle in this case is similar to that of a conventional gasoline engine, except for using a higher compression ratio. That is, the mixture compressed by piston 1 under a high compression ratio is ignited at approximately the top dead center of piston 1 by spark plug 3 and its flame front 21 (FIG. 2) is propagated in combustion chamber 8.

However, in high load operation, such as acceleration or high speed use of the vehicle, the pressure in combustion chamber 8 after ignition becomes extremely high and finally reaches the maximum pressure. Consequently, as mentioned above, the likelihood of knocking and creation of NO will increase. Under such conditions the pressure control device according to the present invention begins to operate and restricts the maximum pressure in the combustion chamber. That is, in this case, the extremely high pressure in the combustion chamber after ignition is transmitted to pressure control chamber 12 retained in a position of substantially zero volume, through passage 9. This pressure forces piston 10 to move upwardly against the preset load of spring 13. As a result of this, piston 10 slides in cylinder 11 and the volume of pressure control chamber 12 becomes larger.

Thus the device makes it possible to prevent the pressure in combustion chamber 8 from exceeding a predetermined value by causing the burnt gas in combustion chamber 8 to spread into pressure control chamber 12. As mentioned above, passage 9 is arranged adjacent to the front end of spark plug 3. This is in order to allow only burnt gas to flow into pressure control chamber 12 and to prevent unburnt gas from flowing into the chamber.

Spring 13, being subject to the pressure of burnt gas in the pressure control chamber 12, is compressed to store an amount of energy corresponding to the restrained pressure. After combustion, when piston 1 begins to fall, and consequently the pressure in combustion chamber 8 also gradually begins to fall, spring 13 gradually returns to its normal position depressing piston 10 and releasing the stored energy. Thus, the burnt gas in pressure control chamber 12 is returned to combustion chamber 8 by the extension of the compressed spring 13 coinciding wih the fall of piston 1, whereby the pressure in combustion chamber 8 is always maintained constant. This cycle is continuously repeated. Thus the maximum pressure in combustion chamber 8 is restricted, and consequently it is possible to prevent knocking and the NO formation. In addition, increase in the rate of fuel consumption may be avoided since energy corresponding to the restrained pressure is stored by spring 13. If a relatively lean mixture is used under a high compression ratio, as aforesaid, the HC and CO components of the exhaust gas may also be decreased.

Figure 3:
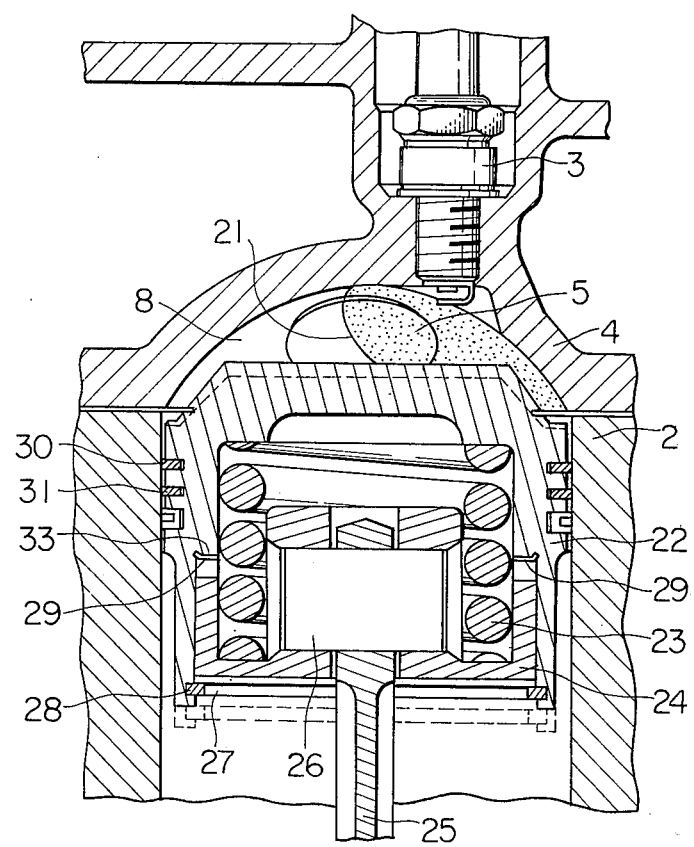
FIG. 3 is a side elevation of an internal combustion engine with a pressure control device according to another embodiment of the present invention.

FIG. 3 shows an another embodiment of the invention. In this embodiment, a pressure control device according to the invention is provided on the piston side, as compared with the first embodiment (FIG. 1 and FIG. 2) where a pressure control device is provided on the cylinder head side.

In FIG. 3, similar reference numerals to those of FIG. 1 and FIG. 2 are used for corresponding parts. Provided in piston body 22 are pressure control spring 23 and slidable retainer 24, which is releasably engaged through piston pin 26 to connecting rod 25 connected to a crank (not shown). Spring 23 rests at its upper end, against the upper surface of the hollow portion of the piston body, and at its lower end, against retainer 24, as shown. Stop 27 is mounted adjacent to the lower portion of piston body 22 and below retainer 24, and retainer 24 biased downwardly by spring 23 rests against the stop. Preferably damping members such as hard rubbers 28, 29 are provided on the under surface of retainer 24 and the shoulder portion 33 of the hollow portion of the piston body, respectively, to damp the sound and impact which would occur when retainer 24 comes into contact with stop 27 and shoulder portion 33. Piston rings and an oil ring indicated at 30, 31 and 32, respectively, are constructed and arranged similar to the corresponding portions of known internal combustion engines.

The pressure control device according to the second embodiment is operated as follows.

In this embodiment also, as in the first embodiment, the pressure control device is not operated during the compression stroke and during low load operation of the engine, since pressure in the combustion chamber after ignition is not high in comparison with the maximum pressure during high load operation of the engine and the bias exerted on piston 22 is not larger than the preset load of spring 23. That is, spring 23 occupies a normal position in which retainer 24 remains in contact with stop 27 and, consequently, the combustion cycle is the same or similar to that of a conventional gasoline engine, except for using a higher compression ratio. As previously described referring to FIG. 1 and FIG. 2, in case of acceleration of the engine or high speed driving, the pressure in the combustion chamber after ignition is extremely high and reaches a maximum pressure. In such operating conditions, the likelihood of knocking and of the creation of NO is increased. At this time, the device according to this embodiment is automatically operated. That is, spring 23 is preset in such a way that it is compressed when the pressure in the combustion chamber reaches a predetermined value. Conversely, when the pressure in the combustion chamber overcomes the preset load of spring 23, the piston body 22 is depressed to increase the inner volume of the combustion chamber 8. For example, the top of piston body 22 and stop 27 (with the other parts shown removed for the sake of clarity) are depressed to the positions shown by broken lines in FIG. 3. In this figure, it will be noted that piston pin 26 and connecting rod 25 are in the same position when the pressure control device is not operated. Thus, the maximum pressure in the combustion chamber 8 may be restricted. In this embodiment, spring 23 is also compressed to store energy corresponding to the restrained pressure. Therefore, when piston body 22 and connecting rod 25 are depressed and the pressure in combustion chamber 8 is gradually decreased after combustion, spring 23 gradually extends to return to the normal position and finally completely releases the stored energy. Thus, the pressure in the combustion chamber 8 may be maintained constant during a given period of tie in the combustion cycle.

In both of these embodiments, the preset loads of spring 13, 23 are determined in such a way that they begin compressing action before the pressure in the combustion chamber reaches a value at which knocking occurs. This makes it possible to prevent the operation of the pressure control device from being behind the motion of flame propagation and the pressure in the combustion chamber from exceeding the predetermined value, because the pressure control device is operated immediately after ignition since the pressure propagation velocity (which is equal to the velocity of sound) in the combustion chamber is much faster than the velocity of flame propagation.

Figure 4A:
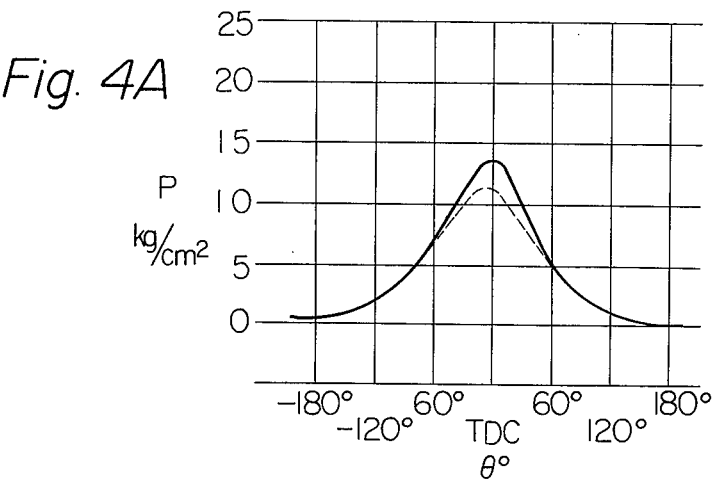
FIG. 4A through FIG. 4C are indicator diagrams of an internal combustion engine according to the invention shown as compared with those of a conventional internal combustion engine.
Figure 4B:
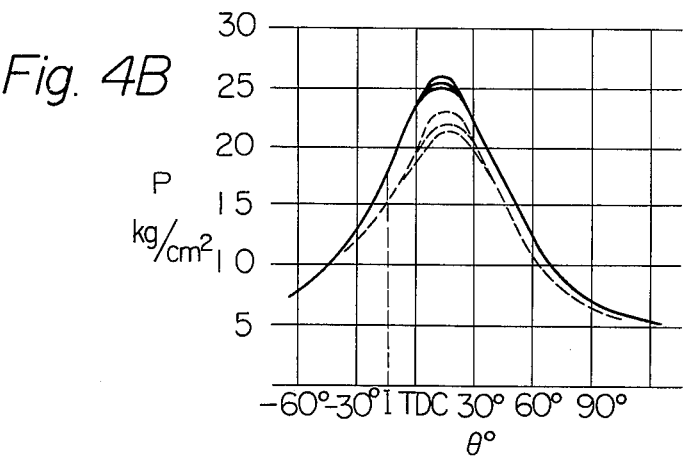
Figure 4C:
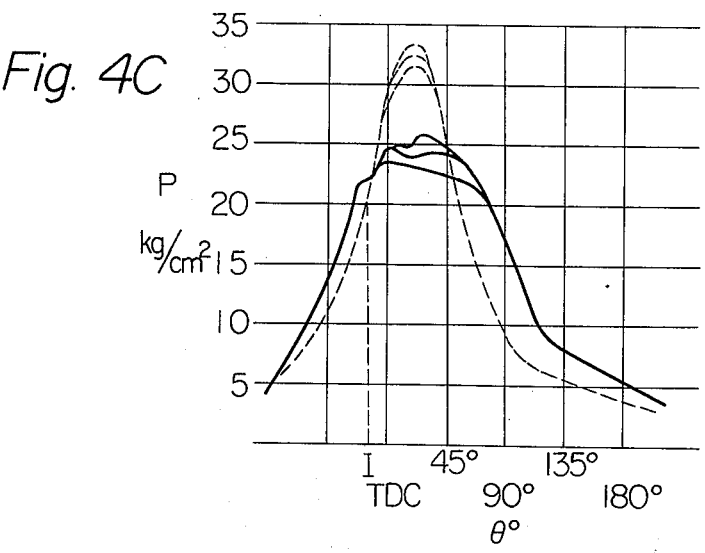

FIG. 4A through 4C show experimentally obtained indicator diagrams of an internal combustion engine according to the present invention (the second embodiment) and of a conventional internal combustion engine (gasoline engine). In these figures, P (kg/cm$^2$) indicates the pressure in the combustion chamber, $\theta$ (°) the crank angle, I the ignition point, TDC the top dead center, the solid lines indicate the internal combustion engine according to the present invention, and the broken lines indicate a conventional internal combustion engine.

FIG. 4A shows indicator diagrams of compressing strokes obtained by experiments, the rotational frequency of the engine being equal to 2400 (rpm) and the throttle valve fully open.

FIG. 4B shows indicator diagrams in low load operation obtained by experiments, the rotational frequency of the engine being equal to 2400 (rpm) and the negative pressure in the intake manifold being equal to 300 (mmHg).

FIG. 4C shows indicator diagrams based on experiments in moderate or high load operation, the rotational frequency of the engine being equal to 2400 (rpm) and the negative pressure in the intake manifold being equal to 120 (mmHg).

In FIGS. 4B and 4C, experiments were performed three times, and from these figures it will be understood that the pressure variation curve of the cylinder pressure during the combustion stroke varies somewhat from one experiment to another, i.e. it does not repeat exactly.

Referring now to FIG. 4A through FIG. 4C, the advantages and effectiveness of the present invention can be summarized as follows.

1. Prevention of knocking

In moderate or high load operation (FIG. 4C), in which the pressure in the combustion chamber after ignition reaches the maximum pressure, the internal combustion engine according to the present invention makes it possible to prevent knocking which occurs because of the compression and spontaneous combustion of unburnt mixtures on the combustion chamber since the maximum pressure in the combustion is restrained as aforesaid.

2. Prevention of the formation of NO

Because the maximum pressure in the combustion chamber is restrained, in moderate or high load operation, as described above in paragraph (1), the formation of NO which occurs under high pressure in the combustion chamber may also be restrained.

It was experimentally confirmed that the quantity of NO is reduced to less than half of the quantity thereof contained in the exhaust gas of a conventional engine without being attended by a decrease of output and an increase of rate of fuel consumption, and also that it is most effective to restrict the maximum pressure in the combustion chamber within the range from 25 (kg/cm$^2$) to 35 (kg/cm$^2$) to prevent the formation of NO component.

3. Improvement of the rate of fuel consumption.

The pressure control device according to the invention is not operated in the low load operating condition which is most frequently used. However, because a relatively high compression ratio may be used, the indicator diagram (solid lines) is larger than that (broken lines) of a conventional engine as shown in FIG. 4B and, consequently, the preset invention does not increase the rate of fuel consumption. Also in the case shown in FIG. 4C, as energy corresponding to the restrained pressure is stored by the spring, it is possible to remove the drawback of increase of rate of fuel consumption which attended previous efforts to restrain the formation of NO.

4. Limiting the formation of the NO, CO and HC components by using a lean mixture. As mentioned above, it is most effective to use a lean mixture to restrain the creation of HC, CO and NO components, however, this has previously been accompanied by problems such as misfire and combustion fluctuation. In order to solve these problems, it is desirable to increase the compression ratio, and according to the invention it is possible to adopt a higher compression ratio while using a lean mixture. Therefore, by using a lean mixture under high compression ratio, according to the invention, it is possible to restrain the creation of the above components and also to prevent misfire and combustion fluctuation and, consequently, operating efficiency may be remarkably increased. In addition to this, as the pressure in the combustion chamber during the compression stroke is higher than that of a conventional gasoline engine, ignition efficiency may be raised and consequently starting of engine becomes easier particularly in winter. It has experimentally confirmed that it is most effective if the compression ratio, when the pressure control device is not operated, lies in the range from 14 to 17. The invention has been described in detail with particular reference to preferred embodiments thereof, but it will be understood that various and modifications can be effected within the spirit and scope of the invention as described above.

What we claim is:

1. An improved low pollution spark ignition gasoline engine of the type that includes a housing having a chamber defined therein, a power member sealingly fitted in the chamber for cyclical movement between a first position in which the volume of a closed combustion space defined between the power member and a portion of the chamber surface is a maximum and a second position in which said combustion space is a minimum, the ratio betwee said maximum volumes defining the compression ratio of the engine; means for supplying air and fuel in selectable amounts to the combustion space for combustion therein; means connected to the power member for transmitting power developed by the pressure of the combusted air-fuel mixture against the member as the member moves from the second position to the first position; and means forming part of the surface of the chamber portion of the combustion space that is displaceable from a normal position to increase the volume of the combustion space, wherein the improvement comprises:

an engine compression ratio higher than that of a conventional spark ignition engine, in the range of approximately 14 to 17, the means for supplying air and fuel in selectable amounts being adjusted to produce a lean mixture in the combustion space, and spring for biasing the displaceable means into the normal position until the pressure of the ignited gases in the combustion space reaches a predetermined value greater than the maximum pressure attained during compression before ignition and for allowing displacement of the displaceable means to prevent the gas pressure from exceeding a predetermined maximum value, the excess energy of said gas being stored by the spring for delivering useful work as the displaceable means returns during each expansion cycle to the normal position, whereby the formation of noxious components in the exhaust gas of said engine is substantially diminished.

2. The engine of claim 1 wherein the housing comprises an engine block having a chamber in the form of an open cylinder and a cylinder head enclosing the open cylinder; the power member comprises a piston reciprocably fitted in the cylinder; the combustion space comprises a combustion chamber defined between the cylinder head and the top of the piston; and the displaceable means is located in the cylinder head.

3. An internal combustion engine according to claim 2 wherein said spring biased means comprises a spring-loaded auxiliary piston, said auxiliary piston being slidably arranged in a pressure control chamber formed in said cylinder head and having an opening communicating with said combustion chamber.

4. An internal combustion engine according to claim 3 wherein said opening of said pressure control chamber is arranged adjacent to the front end of a spark plug provided in the combustion chamber whereby, in operation, substantially only burnt gas flows into said pressure control chamber.

5. An improved low pollution spark ignition gasoline engine of the type that includes a housing having a chamber defined therein; a power member sealingly fitted in the chamber for cyclical movement between a first position in which the volume of a closed combustion space defined between the power member and a portion of the chamber surface is a maximum and a second position in which said combustion space is a minimum, the ratio between said maximum and minimum volumes defined the compression ratio of the engine; means for supplying air and fuel in selectable amounts to the combustion space for combustion therein; means connected to the power member for transmitting power developed by the pressure of the combusted air-fuel mixture against the member as the member moves from the second position to the first position; and means forming at least a portion of the power member that is displacable from a normal position with respect to the power transmitting means to increase the volume of the combustion space, wherein the improvement comprises:

an engine compression ratio higher than that of a conventional spark ignition engine, in the range of approximately 14 to 17, the means for supplying air and fuel in selectable amounts being adjusted to produce a lean mixture in the combustion space, and spring for biasing the displaceable means into the normal position until the pressure of the ignited gases in the combustion space reaches a predetermined value greater than the maximum pressure attained during compression before ignition and for allowing displacement of the displaceable means to prevent the gas pressure from exceeding a predetermined maximum value, the excess energy of said gas being stored by the spring for delivering useful work as the displaceable means reurns during each expansion cycle to the normal position, whereby the formation of noxious components in the exhaust gas of said engine is substantially diminished.

6. The engine of claim 5 wherein the chamber is in the form of a cylinder; the power member comprises a piston reciprocably fitted in the cylinder; the means connected to the power member for transmitting power comprising a connecting rod; and the spring is positioned between the piston and the connecting rod.

* * * * *

UNITED STATES PATENT AND TRADEMARK OFFICE
CERTIFICATE OF CORRECTION

PATENT NO. : 3,964,452
DATED : June 22, 1976
INVENTOR(S) : Norihiko Nakamura, et al It is certified that error appears in the above-identified patent and that said Letters Patent are hereby corrected as shown below:

Col. 1, line 62 - change "ration" to --ratio--

Col. 2, line 39 - change ""Arrhenuis'" to --"Arrhenius'"--

Col. 2, line 52 - change: "$T=T_o(P/P_o)K-1/K$" to -- $T=T_o(P/P_o)\frac{K-1}{K}$ --

Col. 2, line 61 - change "combination" to --combustion--

Col. 3, line 33 - insert "a" between "is" and "resiliently"

Col. 3, line 45 - change "drawing" to --drawings--

Col. 6, line 38 - change "tie" to --time--

Col. 7, line 27 - change "on" to --in--

Col. 8, line 15 - change "various" to --variations--

Col. 8, line 27 - correct spelling of "between"; insert --and minimum-- between "maximum" and "volumes"

Col. 9, line 20 - change "defined" to --defining--

Col. 10, line 18 - correct spelling of "returns"

Col. 10, line 27 - change "comprising" to --comprises--

Signed and Sealed this

Fifth Day of October 1976

[SEAL]

Attest:

RUTH C. MASON
Attesting Officer

C. MARSHALL DANN
Commissioner of Patents and Trademarks